(12) United States Patent
Mohan et al.

(10) Patent No.: US 12,277,350 B1
(45) Date of Patent: Apr. 15, 2025

(54) VIRTUAL METADATA STORAGE

(71) Applicant: Astera Labs, Inc., Santa Clara, CA (US)

(72) Inventors: Jitendra Mohan, Santa Clara, CA (US); Justina Provine, Fremont, CA (US); Anh T. Tran, Elk Grove, CA (US); Ken (Keqin) Han, Fremont, CA (US); Enrique Musoll, San Jose, CA (US)

(73) Assignee: Astera Labs, Inc., Santa Clara, CA (US)

( * ) Notice: Subject to any disclaimer, the term of this patent is extended or adjusted under 35 U.S.C. 154(b) by 0 days.

(21) Appl. No.: 18/385,021

(22) Filed: Oct. 30, 2023

(51) Int. Cl.
G06F 3/06 (2006.01)

(52) U.S. Cl.
CPC .......... *G06F 3/0664* (2013.01); *G06F 3/0619* (2013.01); *G06F 3/0673* (2013.01)

(58) Field of Classification Search
CPC ..... G06F 3/0664; G06F 3/0673; G06F 3/0619
See application file for complete search history.

(56) References Cited

U.S. PATENT DOCUMENTS

| | | | |
|---|---|---|---|
| 4,507,779 A | 3/1985 | Barner, Jr. et al. |
| 4,541,091 A | 9/1985 | Nishida et al. |
| 4,541,092 A | 9/1985 | Sako et al. |
| 4,607,367 A | 8/1986 | Ive et al. |
| 5,010,554 A | 4/1991 | Bechtel et al. |
| 5,051,998 A | 9/1991 | Murai et al. |
| 5,430,739 A | 7/1995 | Wei et al. |
| 5,483,236 A | 1/1996 | Bi |
| 5,926,490 A | 7/1999 | Reed et al. |
| 5,961,658 A | 10/1999 | Reed et al. |
| 6,009,549 A | 12/1999 | Bliss et al. |
| 6,332,206 B1 | 12/2001 | Nakatsuji et al. |
| 8,694,862 B2 * | 4/2014 | Sazeides ............. H03M 13/033 714/766 |
| 9,569,308 B1 | 2/2017 | Ware et al. |
| 10,797,728 B1 | 10/2020 | Varnica |

(Continued)

OTHER PUBLICATIONS

Intel Corporation, "Intel Xeon Processor E5-1600/2400/2600/4600 v3 Product Families Datasheet—vol. 2: Registers," Jun. 2015, 414 pages.

(Continued)

*Primary Examiner* — Mark A Giardino, Jr.
(74) *Attorney, Agent, or Firm* — Charles Shemwell (57) ABSTRACT

A decoding engine within an integrated-circuit (IC) component executes a first plurality of error detection/correction operations with respect to first and second pluralities of data volumes to generate a corresponding first and second pluralities of error syndrome values. Each data volume of the first plurality of data volumes includes a first data block and a first error correction code together with a respective one of a plurality of unique q-bit metadata values, and each data volume of the second plurality of data volumes includes a second data block and a second error correction code together with a respective one of the plurality of unique q-bit metadata values. Output circuitry within the decoding engine selects one of the plurality of q-bit metadata values to be an output q-bit metadata value according to error-count differentiation indicated by the first and second pluralities of error syndrome values.

21 Claims, 8 Drawing Sheets

(56) References Cited

U.S. PATENT DOCUMENTS

| | | | |
|---|---|---|---|
| 2001/0036236 A1 | 11/2001 | Kobayashi et al. | |
| 2002/0199153 A1 | 12/2002 | Fall | |
| 2003/0031236 A1 | 2/2003 | Dahlman et al. | |
| 2010/0299575 A1 | 11/2010 | Roth et al. | |
| 2012/0121084 A1 | 5/2012 | Tomlinson et al. | |
| 2012/0284589 A1 | 11/2012 | Kim et al. | |
| 2013/0246889 A1 | 9/2013 | Kumar et al. | |
| 2014/0047265 A1 | 2/2014 | Das et al. | |
| 2014/0068390 A1 | 3/2014 | Schmidberger et al. | |
| 2014/0136931 A1 | 5/2014 | Nakamura et al. | |
| 2016/0006459 A1 | 1/2016 | Hanham et al. | |
| 2016/0092307 A1 | 3/2016 | Bonen et al. | |
| 2016/0336971 A1 | 11/2016 | Fong et al. | |
| 2016/0365876 A1* | 12/2016 | Greenspan | H03M 13/451 |
| 2017/0255394 A1 | 9/2017 | Suh et al. | |
| 2017/0093528 A1 | 11/2017 | Oveis et al. | |
| 2018/0060160 A1 | 3/2018 | Fang et al. | |
| 2020/0097359 A1 | 3/2020 | O'Connor et al. | |
| 2020/0401475 A1 | 12/2020 | Lu | |
| 2021/0208967 A1* | 7/2021 | Cha | H03M 13/13 |
| 2022/0013187 A1 | 1/2022 | Santhanam | |
| 2022/0091936 A1* | 3/2022 | La Fetra | G06F 11/1076 |
| 2024/0380415 A1* | 11/2024 | Dakshinamoorthy | H03M 13/6561 |

OTHER PUBLICATIONS

Molka et al., "Cache Coherence Protocol and Memory Performance of the Intel Haswell-EP Architecture," IEEE 2015, 10 pages.

* cited by examiner

FIG. 8
SDC avoidance
(RS aliasing detection)

FIG. 9B

| | CL Frag0 | CL Frag1 | CL Frag2 | CL Frag3 | |
|---|---|---|---|---|---|
| decode MD=000b | #err > 2 | #err > 2 | #err > 2 | #err > 2 | i=1 |
| decode MD=001b | #err > 2 | #err = 2 | #err > 2 | #err > 2 | i=2 |
| decode MD=010b | #err = 2 | #err = 2 | #err > 2 | #err = 2 | i=3 |
| decode MD=011b | #err = 2 | #err = 2 | #err = 2 | #err = 2 | i=4 |
| decode MD=111b | #err > 2 | #err > 2 | #err > 2 | #err > 2 | i=5 |

327 — #err for $i^{th}$ of N same-frag decodes is less than 3 and fewer than #err for all others of those N decodes

FIG. 9C per-decode contribution
- 0: error count ≤ 2
- 1: error count > 2

| | CL Frag0 | CL Frag1 | CL Frag2 | CL Frag3 | score | |
|---|---|---|---|---|---|---|
| decode MD=000b | #err = 2 | #err > 2 | #err > 2 | #err > 2 | 3 | i=1 |
| decode MD=001b | #err > 2 | #err = 2 | #err > 2 | #err > 2 | 3 | i=2 |
| decode MD=010b | #err = 2 | #err = 2 | #err = 2 | #err = 2 | 0 | i=3 |
| decode MD=011b | #err > 2 | #err > 2 | #err > 2 | #err = 2 | 3 | i=4 |
| decode MD=111b | #err > 2 | #err = 2 | #err > 2 | #err > 2 | 2 | i=5 |

331 — #err for $i^{th}$ one and only $i^{th}$ one of N same-frag decodes is less than 3 for all 4 fragment decodes

VIRTUAL METADATA STORAGE

DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments herein a memory control component encodes over-capacity data into an error correction code (ECC) generated for and stored in association with an application data block, inferentially recovering the over-capacity data during application data block read-back by comparing error syndromes generated in detection/correction operations for respective combinations of each possible value of the over-capacity data and the read-back application data block. In a number of embodiments, application data blocks and corresponding data-encoded ECCs are stored within and read back from integrated-circuit memory devices disposed on a dual inline memory module (DIMM), with the ECC-encoded over-capacity data storage increasing the effective data storage capacity of the DIMM in accordance with the relative sizes (volumes, bit-counts) of the application data block and over-capacity data. In applications where the over-capacity data is generated by (and returned upon read-back to) one or more components or entities other than the application data requestor—as in the case of metadata storage required by various high-performance interconnect standards—ECC-encoded over-capacity storage of the metadata obviates both compromised application data storage capacity (e.g., where metadata storage would otherwise consume some portion of the application data storage capacity) and auxiliary hardware storage expense/overhead (i.e., no need for the costly and area-consuming additional memory that plagues conventional metadata storage solutions).

Figure 1:
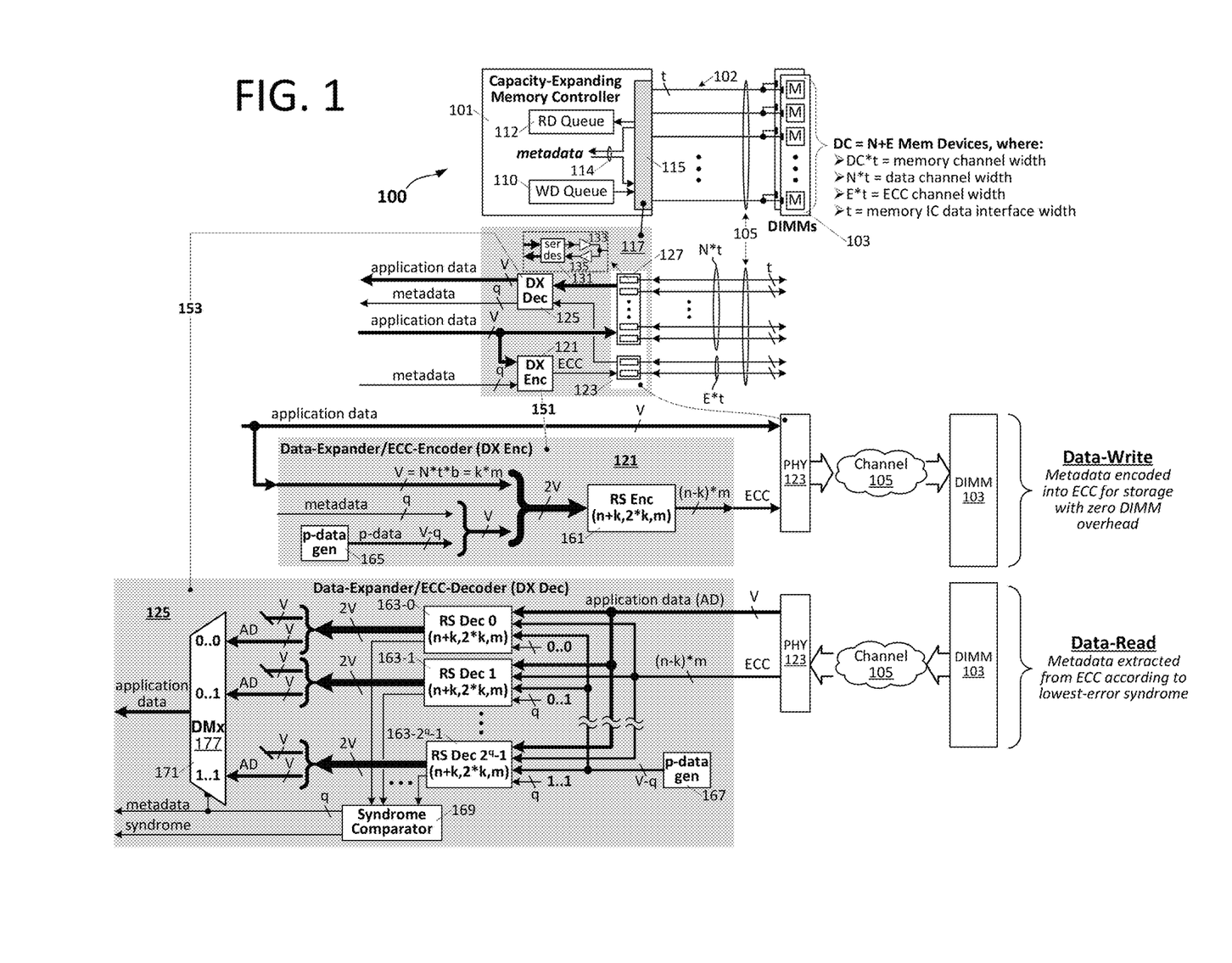
FIG. 1 illustrates an embodiment of a memory system having a capacity-expanding memory control component coupled to one or more dual inline memory modules (DIMMs)

FIG. 1 illustrates an embodiment of a memory system 100 having a capacity-expanding memory control component 101 coupled via data links 102 to one or more DIMMs 103. In the depicted example, memory control component 101 ("controller") includes write and read data queues (110, 112) together with connections (114) to a "metadata" source/destination (which could be the read and write data queues themselves rather than an alternative entity) and an error detecting/correcting data-signaling interface 115, the latter to generate for each outgoing write data block (a volume of "application" data to be stored/written within constituent memory devices of a selected DIMM 103 in a memory write transaction) an error correction code to be stored in DIMM 103 with the write data block. During data read-back, both the application data (the write data block during the memory-write transaction and now, in a subsequent memory read transaction, a read data block) and the corresponding error correction code are output from DIMM 103 to controller 101, the latter (ECC) being applied within data signaling interface 115 to detect, and if necessary/possible, correct corrupted (bad) symbols within the retrieved application data block.

Referring to detail view 117 of signaling interface 115, the metadata and corresponding application data block are applied, during a data write transaction, to data-expander/ECC encoding circuitry 121 which responsively generates a data-dependent ECC—an error correction code that reflects both the application data block and the metadata—outputting the application data block and ECC to a selected DIMM via physical signaling interface 123 (PHY). During subsequent data read back (i.e., in a memory read transaction), the retrieved-from-memory application data block and ECC (arriving via PHY 123) are applied, in combination with each possible metadata value (and thus $2^q$ different values or bit patterns where the metadata is constituted by 'q' bits), to data-expander/ECC decoding circuitry 125 to yield $2^q$ error syndromes—a respective syndrome for each different possible metadata value. Assuming for sake of explanation that there are no errors in the read-back application data block or ECC, then whichever of the $2^q$ metadata values supplied to ECC decoder 125 matches the metadata value used to encode the ECC will yield a no-error syndrome (i.e., syndrome value indicating that no errors were detected), distinguishing that specific metadata value from all others (as the syndromes generated using the remaining $2^q-1$ metadata values will all indicate one error corresponding to the incorrect metadata value) and thus enabling the originally written metadata value to be recovered (or inferred, extracted) as part of the ECC decoding operation. As a more specific example, where ECC encoding/decoding is implemented as part of a block-based error correction/detection scheme that enables detection of errors with multi-bit symbol granularity (e.g., 4-bit symbol, 8-bit symbol, etc.), the ECC decode operation applying the correct (original-matching) metadata value will produce one fewer symbol errors than all other (incorrect) metadata values—again, enabling recovery of the originally "written" metadata value. Because the size of the stored application data block and corresponding ECC exactly match the data block size and ECC size stored in a conventional memory system, the metadata is effectively stored (as part of the controller ECC encoding) and then retrieved (controller ECC decoding) with zero additional memory consumption within the DIMM. That is, the DIMM capacity available for application data storage (with such data including any type of user data, hardware-generated data, operating-system data, etc.) remains intact and uncompromised, and likewise with the storage space available for ECC—effectively expanding the capacity of the DIMM by a factor of (q+V)/V (where 'V' is the bit-size of the application data block) through additional ECC encoding and decoding.

In the FIG. 1 embodiment and a number of embodiments discussed below, data-expander/encoder 121 executes Reed-Solomon (RS) encoding (i.e., implements an RS encoder) to generate the metadata-dependent ECC during data write, and data-expander/decoder 125 executes $2^q$ RS decoding operations (within one or more RS decoders) during data read—one RS decoding operation for each of the $2^q$ possible metadata values—to both recover the ECC-encoded metadata bits and implement the primary ECC function (detecting/correcting symbol errors). To maintain a power-of-two message size (i.e., number (k) of m-bit symbols constituted by the data supplied to the RS encoder) despite the added metadata bits, the ECC encoders/decoders are enlarged/upgraded (relative to those needed for the application data block alone) to accommodate a message size twice that of the application data block (i.e., 2*V bits, where '*' denotes multiplication) and additional pattern data bits are combined with the metadata as necessary to produce the expanded, double-size data input. More specifically with regard to message size expansion, the V-bit application data block and q-bit metadata are supplemented by V–q (V minus q) bits of deterministic pattern data to form the expanded (2*V-bit) data input to the RS encoder during a data write transaction to a given memory address (yielding the ECC written with the application data block). Likewise, in a subsequent data read transaction directed to that same address, the retrieved application data block (V bits) is supplemented/expanded by the deterministic pattern data (i.e., regenerated within the controller as the pattern data has a predetermined or deterministically generable bit pattern) to form, together with each of the $2^q$ possible metadata values, $2^q$ messages each constituted by 2*V bits and differing only in the metadata value. While the FIG. 1 embodiment and other embodiments discussed below generally present a doubled expansion (i.e., from V to 2*V) of the message size (volume of data supplied to ECC encoder and then again to ECC decoder) relative to the application data block size (V), the message size may more generally be expanded by any practicable number of bits in all cases and, at least in an RS encoding/decoding scheme, by one or more or any practicable number of RS symbols (e.g., each RS symbol constituted by a predetermined number of bits) and thus to a size lesser than or greater than 2*V bits.

FIG. 1 illustrates the above-described data-expansion and encoder/decoder enlargement in detail views 151 and 153 (of data-expander/encoder 121 and data-expander/decoder 125, respectively) in the context of RS encoders/decoders parameterized by block size, message size and symbol size—that is, "n, k, m" where 'm' is the size of a correctable symbol in bits, 'k' is the number of symbols per message (as described above), and 'n' is the total number of symbols per block such that n=k+w, where 'w' is the number of symbols used for ECC ('w' is also the number of detectable corrupted/bad symbols, and twice the number of correctable bad symbols). Thus, RS encoder 161 within data-expander/encoder 121 is enlarged relative to a baseline RS (n, k, m) encoder to implement RS (n+k, 2*k, m) and ditto for each of the RS decoders (163-0 to 163-$2^q$–1) within data-expander/decoder 125—all enlarged from RS (n, k, m) to RS (n+k, 2*k, m). The expanded message. 2*k, contains the original message (k), metadata bits and deterministic pattern bits.

Still referring to detail views 151 and 153, pattern data generators 165 and 167 are implemented within data-expander/encoder 121 and data-expander/decoder 125, respectively, to produce the pattern data bits ("p-data") merged with the metadata (or each of the possible metadata values within decoder 125) and application data block to yield the expanded (doubled) message size. In differing embodiments, the pattern generators may output either fixed pattern values (e.g., all '1's, all '0's, alternating '1' and '0' patterns or any other fixed/static bit pattern) or dynamic bit patterns. In the latter (dynamic pattern) case, for example, a pseudorandom number generator may be seeded by the memory address of the subject application data block and/or any other fiducial information available within the controller integrated circuit, with temporary storage of any ephemeral value (e.g., memory read address) as necessary to make that value available for pattern data re-generation at ECC decode time. Also, in the case of fixed/static pattern data at least, the same pattern data source (e.g., set of nodes coupled to ground and/or VDD) may supply pattern data to both the enlarged RS encoder and enlarged RS decoder (i.e., only one pattern data source need be implemented).

Referring specifically to detail view 153 of data expander/ECC decoder 125, each of the $2^q$ enlarged RS decoders (generically, 163) outputs an error syndrome together with error-corrected (if necessary/possible) message data, the latter constituted by 2*V bits that include the V-bit application data block together with V bits of merged pattern data/metadata. Syndrome comparator 169 evaluates/compares the $2^q$ error syndromes, identifying one of those syndromes as reflecting one fewer symbol errors than the others and outputting, as the recovered metadata value, a q-bit index corresponding to the RS decoder that sourced that fewest-symbol-error syndrome. As shown, the recovered metadata is supplied to multiplexer/selector circuit 171 to select, as the read-back (and possibly error-corrected) application data block, the V-bit application data block from the RS decoder that sourced the fewest-error syndrome. Note that the remaining V bits of metadata-selected RS decoder output may be dropped/ignored as those bits merely constitute locally generated content (the pattern data) and metadata (already recovered). In alternative embodiments in which RS decoder indices do not correspond one-for-one with corresponding metadata values, multiplexer 171 may pass both the application data block and the metadata components (V+q bits) output by the syndrome-identified RS decoder (i.e., in response to the q-bit index output from syndrome comparator 169) to downstream logic.

Still referring to FIG. 1, various capabilities and configurations of physical memory (DIMMs in the depicted example) may bear on data-expander/encoder and data-expander/decoder implementations—for example, matching the RS symbol size (m) to the data interface width 't' of an individual DIMM-mounted memory device (or an integer multiple or divisor thereof) to enable application data recovery (and thus ongoing system operation) despite a failed memory device (i.e., where every symbol output from that memory device is bad). In the FIG. 1 embodiment, for instance, the application data block and ECC generated by data expander/ECC encoder 121 are forwarded to I/O circuitry 123 which, in turn, transmits those block components (application data block and ECC) to a selected DIMM via respective data channel and ECC channel components of memory channel 105. Where individual symbols are distributed physically across the data interface of one or more memory devices, implementing the enlarged RS decoder to have (i) a symbol size m that matches (or is an integer multiple) the memory device width 't' and (ii) an error correction capability ((n-k)/2) that matches or exceeds the total number of symbols written to/read-back from an individual memory device in a given data block read or write, enables recovery of data written to a failed memory device (i.e., for which all or any subset of the data output is nominally corrupted/bad). Data written to/read from a failed DIMM component (memory device) may similarly be recovered where individual symbols are distributed temporally (sequentially in time) within the data burst over one or more signaling links of a given memory device—in that case by implementing the enlarged RS decoder to have symbol size that matches or is a divisor of the burst length and an error correction capability that matches the total number of symbols written to/read back from an individual memory device in a data block write/read.

Referring to the I/O circuit embodiment shown in detail view 117, a serializer/deserializer circuit 127 serializes each outgoing application data block data for burst transmission (per-link serializer/deserializer 131 generating multiple serial bits per link via output driver circuits 133 (and deserializing serial bits received via counterpart receivers 135 during read data receipt)) to a number (N) of memory devices over an N*t bit data channel, where the burst length 'BL' (number of bit-time intervals or "beats" per application data block transmission) is set according to the ratio of the application data block size (V) to the data channel width (N*t) so that BL=V/(N*t). Likewise for the outgoing ECC—serialized for transmission to a number (E) of memory device over an E*t bit ECC channel, again with burst length 'BL'. Accordingly, by setting (i) RS symbol size 'm' in accordance with the memory device width 't' and/or burst length so that each memory device will store an integer number (BL*t/m) of symbols per data-block write (and output that same integer number of symbols per data-block read), and (ii) setting the RS error correction capability (n-k)/2 to meet or exceed BL/t (the number of symbols stored per memory device per application data block write, application data blocks written to the subject DIMM may be recovered on data read-back despite systemic failure of a single memory device, thus permitting ongoing memory system operation albeit with greater exposure to random (non-systemic) symbol error.

Device-failure tolerance is achieved in various embodiments of the FIG. 1 memory system by implementing the data-expander/encoder/decoder circuitry in accordance with application data block size (V), memory channel width in bits and number of connected memory devices (N+E)—i.e., implementing the RS encoders/decoders to effect an m-bit symbol size and an error correction capability that meets or exceeds the number of symbols stored in each individual memory device per write data burst (i.e., BL*t/m). As a specific example, in a memory system populated by one or more DIMMs each having two independent 40-bit memory channels (32-bit data channel, 8-bit ECC channel), 16-byte application data block size (so that burst length=4), and either 4-bit or 8-bit memory-device interface widths (e.g., in compliance with the JEDEC DDR5 standard), a distinct/dedicated controller-side signaling interface 115 may be implemented for each data channel with RS encoder/decoder parameters (n'=w+k', k'=2k, m), where m=8, w=4, k=16*8/m and n=w+k=20*8/m. That is, RS (36, 32, 8), with each 16-byte application data block and ECC conveyed to ten ×4 memory devices or five ×8 memory devices. ECC encoding/decoding may be implemented with numerous other RS parameters according to characteristics of the subject memory system and error detection/correction objectives.

Figure 2:
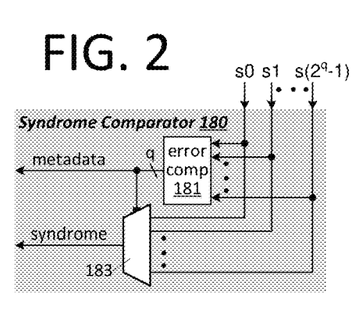
FIG. 2 illustrates an exemplary syndrome comparator embodiment that may be used to implement the syndrome comparator shown in FIG. 1.

FIG. 2 illustrates an exemplary syndrome comparator embodiment 180 that may be used to implement syndrome comparator 169 of FIG. 1. As shown, the syndrome comparator includes an error comparator circuit 181 that compares the $2^q$ incoming syndromes (S0 to S($2^q$–1)) and encodes, as the recovered metadata value, an q-bit index corresponding to the syndrome reporting one fewer bad symbols than the others. That index (metadata value) is supplied to multiplexer 183 to select the corresponding syndrome (i.e., reporting one fewer bad symbols than the others) as the finalized syndrome of the RS decoding operation.

Figure 3:
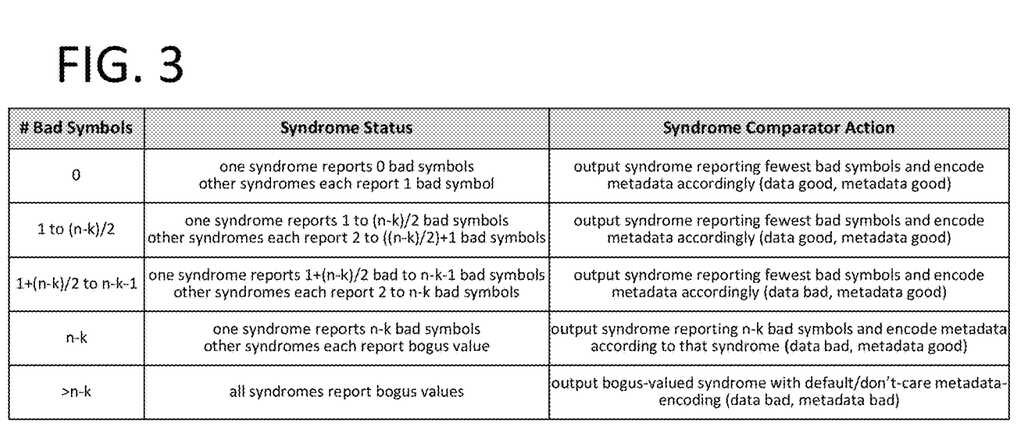
FIG. 3 presents an exemplary listing/tabulation of actions implemented by the FIG. 2 syndrome comparator for various syndrome status conditions and corresponding bad-symbol counts in the case where metadata size is less than or equal to Reed-Solomon (RS) symbol size.

FIG. 3 presents an exemplary listing/tabulation of actions implemented by the FIG. 2 syndrome comparator for various syndrome status conditions and corresponding bad-symbol counts. Where the incoming application data block contains no (zero) bad symbols, the syndrome from the RS decoder receiving the correct metadata value (i.e., matching the metadata encoded into the ECC during data write) will report zero bad symbols, while the syndromes from the other RS decoders will each report one bad symbol (as none of the metadata values supplied to those decoders matches the metadata encoded into the ECC during data write). Accordingly, the syndrome comparator outputs the syndrome reporting zero bad symbols together with the corresponding metadata value (e.g., encoding the output metadata as the index of the RS decoder that supplied the zero-error syndrome).

Continuing with FIG. 3, where the application data block contains a correctable number of bad symbols (1 to (n–k)/2 bad symbols), one of the syndromes will report that number of bad symbols, while the others report one additional bad symbol (i.e., 2 to 1+(n–k)/2 bad symbols) due to the incorrect metadata values supplied to their RS decoders. Accordingly, as in the zero-bad-symbol case, the syndrome comparator outputs the syndrome reporting the fewest bad symbols and the corresponding metadata value. As the application data block contained a correctable number of bad symbols, those symbols are corrected in RS decoded application data (i.e., both the finalized application data block and the metadata are error-free/good).

The next two entries in the FIG. 3 table correspond to application data blocks having a detectable but not correctable number of bad symbols—from 1+(n–k)/2 bad symbols to n-k bad symbols, with the n-k case presented separately to emphasize optional/programmable syndrome-comparator behavior. These two entries (third and fourth rows of table) assume a decoder implementation—Reed Solomon or otherwise—capable of reporting a specific number of symbol errors greater than the correction limit (n–k)/2 and less than or equal to the detection limit (i.e., symbol error count between 1+(n−k)/2 and n−k). In the case of decoder implementations that merely report a pass-fail result—that the number of symbol errors is either within the correction limit (a "pass" result as such errors are located and corrected) or exceeds the correction limit ("fail")—the syndromes generate by the parallel decode operations are indistinguishable under the cases shown in rows three and four of the FIG. 3 table (i.e., all merely reporting >(n−k)/2 symbol errors) so that the syndrome comparator action corresponds to that shown in the final row of the table at least to validity of the application data and meta data (i.e., data bad, metadata bad).

In the case of a decoder capable of reporting a specific number of symbol errors greater than the correction limit (and less than the detection limit) and the bad-symbol count shown in row 3 of the Figure table, (symbol error count greater than (n−k)/2 and less than n−k first (i.e., third row of table), the syndrome comparator behaves as in the first two table rows, outputting the syndrome reporting the fewest bad symbols and corresponding metadata. In this instance, the metadata is confirmed to be correct (good) while the application data block is reported (by the output syndrome) to have between 1+(n−k)/2 and (n−k−1) uncorrected symbols—data is bad. In the n−k bad-symbol case (fourth row of FIG. 3 table), the syndrome from the RS decoder receiving the correct metadata value will report n−k bad symbols, while the syndromes from the other RS decoders will each report a "bogus" value indicating an indefinite number of symbols greater than n−k. In one embodiment the syndrome comparator action in this instance is established by a programmed policy setting (e.g., within a programmable register or other configuration circuit) to interpret the bogus-valued syndromes as reflecting either (i) exactly n−k bad symbols within the application data block plus one bad symbol resulting from invalid metadata (i.e., so that the n−k+1 bad symbols exceeds the bad-symbol reporting threshold), or (ii) an unknown number of symbol errors within the application data block and thus a lack of trust in the syndrome reporting n−k bad symbols. In the first instance (bogus-valued syndromes interpreted as reporting n−k bad symbols in application data block), the syndrome comparator executes the same action as in the prior table rows—outputting the syndrome that reported the fewest bad symbols (n−k) together with the corresponding metadata value. Note that with this action, the overall data-expander/RS decoding exactly the matches the behavior and performance of a conventional RS decoder (i.e., no functionality is compromised). In the second instance (lack of trust in syndrome reporting n−k symbols), the syndrome comparator outputs a bogus-valued syndrome to indicate both the application data block and metadata are bad (outputting, for example, the metadata corresponding to the (n−k)-reporting syndrome). If all the syndromes report bogus values (final line of FIG. 3 table), the syndrome comparator outputs any of those syndromes (e.g., the syndrome sourced by the RS decoder having the lowest index) to indicate that both the application data block and metadata are bad (outputting, for example, the index of the syndrome-sourcing RS decoder as the metadata).

Figure 4:
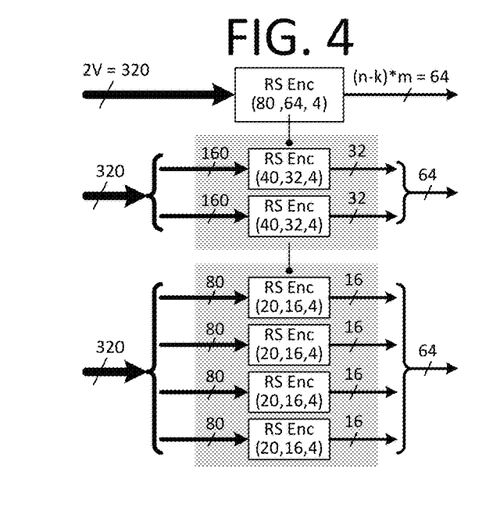
FIG. 4 illustrates an exemplary RS encoder implemented by two or more component RS encoders.
Figure 5:
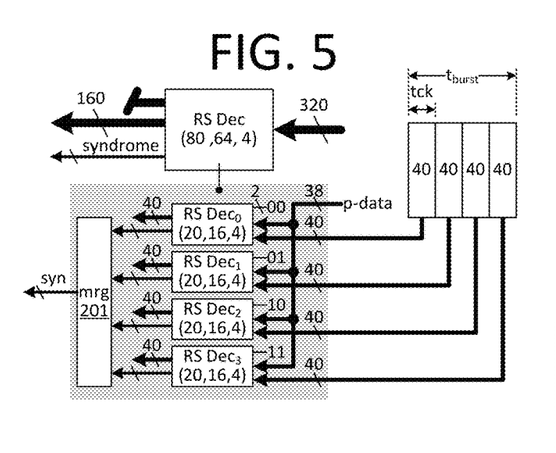
FIG. 5 illustrates an exemplary RS decoder likewise be implemented by two or more component RS decoders.
Figure 6:
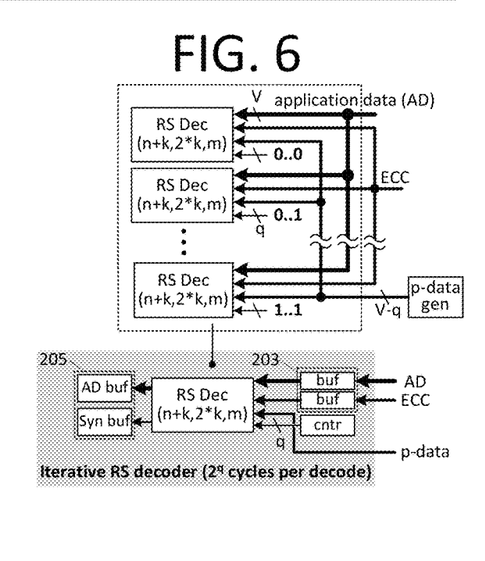
FIG. 6 illustrates exemplary application of a single RS decoder to iteratively execute multiple RS decode operations with respect to the same application data block.

While FIGS. 1-3 have been described with respect to Reed-Solomon encoder/decoder implementations, any practicable block-code encoding/decoding schemes (e.g., other linear block code encoders, other polynomial code encoders) may be used in alternative embodiments. Also, in some embodiments (including embodiments with block-code or polynomial encoder/decoders other than the RS encoders/decoders shown), the input message length after combining the metadata bits, application data block and any pattern data may be less than twice the size of the original application data block (i.e., between V+q and 2V−1, inclusive). More generally, the reference to application data block herein refers to data from any practicable source within the host system (e.g., operating-system data, hardware-function-related data, process data, etc.) and the host system itself may be any computing device or other device requiring data storage and retrieval (e.g., smartphone or other handheld computing device or appliance, laptop computer, network appliance, smart television or other home appliance, etc.). Similarly, though DIMM-mounted memory devices and interconnects thereto are depicted in FIG. 1, physical memory may be implemented in any practicable arrangement and form factor (e.g., system-in-package having one or more memory dies, IC-package-based memory module, etc.). Also, while referred to herein as metadata, the ECC-encoded (over-capacity) data may be constituted by any type of data from any source, and while the amount of ECC-encoded data (q) is generally expected to be small (e.g., 2 bits per application data block to support Compute Express Link (CXL) or similarly small number of bits to support other cache-coherent interconnects), q may generally have any practicable value up to $2^m$, where 'm' is the ECC symbol size in bits. Additionally, while RS encoding/decoding operations have been described in terms of individual encoders/decoders that operate on an expanded message size (e.g., twice the application data block size in the FIG. 1-3 embodiments), each RS (n', k', m) encoder/decoder may be implemented by two or more component encoders/decoders. FIG. 4, for example, illustrates an RS (80, 64, 4) encoder implemented by two component RS (40, 32, 4) encoders, or by four component RS (20, 16, 4) encoders, etc. RS decoders may likewise be implemented by component decoders to achieve a desired decode sequence, including component decoders that operate with respect to staggered input data arrival times as shown, for example, in FIG. 5—four component RS (20, 16, 4) decoders operating respectively on successively received portions of application data block, with component syndrome values merged within merge circuitry 201 to yield final per-decoder syndrome. In yet other embodiments, the $2^q$ parallel RS decoders shown in FIG. 1 may be implemented by one or more iteratively cycled RS decoders, each such decoder generating a corrected application data block and syndrome per iteration with respect to per-iteration incremented metadata value. FIG. 6 illustrates such an approach using a single RS decoder to carry out $2^q$ RS decode operations each with respect to the same application data block, ECC value and pattern data (buffering those values as necessary to ensure their availability, 203), and with a counter-incremented q-bit metadata value (q=2 in the depicted example). The syndrome and corrected application data block generated in each RS decode iteration may be buffered as necessary (205) to enable syndrome comparator operation and finalized application data block selection (e.g., as shown in FIG. 2).

The metadata-sequencing component of FIG. 6—depicted as a counter ("cntr") may generate candidate metadata values according to any useful count sequence (e.g., count-up, count-down, gray-code counting or other encoded counting rather than binary counting, etc.) and more generally may increment the per-iteration metadata in any practicable sequence, including non-linear sequences, tabulated and/or algorithmically-generated sequences (the latter including, for example and without limitation, heuristically-generated metadata sequences, adaptively-generated sequences, etc.). In a number of iterative RS decoding embodiments discussed below, a metadata-sequencing engine leverages known or observed metadata value proclivities/likelihood to ascertain the correct metadata output (i.e., an RS decode yielding a zero-error syndrome or one-fewer-error syndrome and thus detection of correct/recovered metadata bit pattern—a metadata "hit") with minimal RS decoder iteration, avoiding the incremental latency and power consumption of successive decode iterations while retaining the reduced die area benefit relative to a fully-parallel implementation (i.e., decoding engine having $2^q$ parallel RS decoders).

In a number of embodiments, memory read and write transactions operate with cache line granularity—writing or reading whole cache lines, with some number 'q' of metadata bits being associated with each cache line. In those cases, the memory control component (e.g., component 101 of FIG. 1) may implement capacity-expanding RS encoding/decoding with respect to two or more constituent sub-blocks or fragments of an individual cache line, encoding respective fragments of a metadata value (i.e., one or more metadata bits) together with those cache line fragments to generate per-fragment codewords (each codeword including the cache line fragment and ECC value, the latter reflecting the metadata fragment) that are written to memory. At cache line readout (i.e., when requested by host), the constituent codewords are each separately RS decoded (with data expansion as discussed) to generate an error-corrected cache line fragment and recovered metadata fragment. Because the total number of candidate metadata values within each decode is reduced by the fragmentation factor, F (i.e., F=number of cache line fragments per cache line), the total number of RS decode operations required to recover the full metadata value becomes 2*q instead of $2^q$ (i.e., (so long as q≤F) and is thus reduced by a factor of $2^{q-1}/q$.

Figure 7:
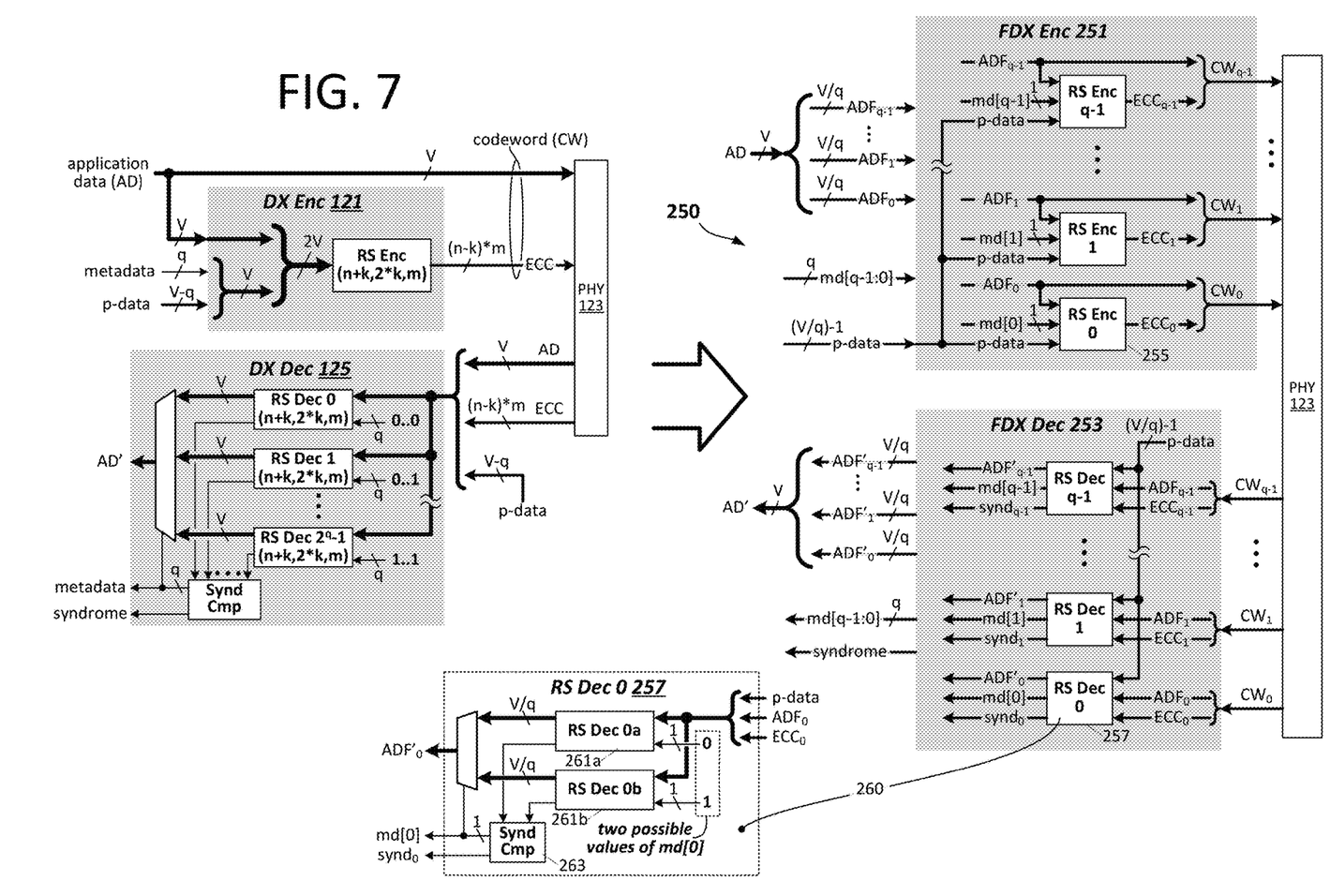
FIG. 7 illustrates an embodiment of a fragmenting data-expanding RS encoder/decoder set that implements data-expanded RS encoding and decoding operations with respect to multiple fragments of an application data block.

FIG. 7 illustrates an embodiment of a fragmenting data-expanding RS encoder/decoder set 250 (FDX encoder 251 and FDX decoder 253) that implements data-expanded RS encoding and decoding operations with respect to F=q fragments of an application data block—generating and then decoding F codewords, each including an ECC value and V/q-sized application data block fragment, where V is the bit-depth of the overall application data block and q is metadata bit depth. As shown, FDX encoder 251 includes 'q' RS encoder components 255 each coupled to receive a respective one of the q application data block fragments ($ADF_0$-$ADF_{q-1}$), a respective one of the q metadata bits (md[0]-md[q−1]), such that the metadata fragment size is a single bit, and pattern data to pad the remainder of the 2V-sized message. The fragmenting data-expanding decoder 253 likewise includes 'q' decode engines 257, each coupled to receive a respective one of the inbound (i.e., read out of memory) codewords (ECC and ADF) together with pattern data. As shown in detail view 260, each decode engine 257 includes two component RS decoders 261a, 261b that receive, along with the pattern data and ADF/ECC codeword, respective values of the metadata bit for the subject codeword—that is a logic '0' metadata input to one component decoder and a logic '1' metadata input to the other (the only two possibilities). By this arrangement, the two component decoders (collectively and generically 261) operate generally as discussed above to generate respective syndromes having divergent numbers of symbol errors and more specifically in which the decoder receiving the "correct" candidate metadata bit will yield one fewer symbol error than the decoder receiving the opposite-state (incorrect) candidate metadata bit. Accordingly, a syndrome comparator 263 resolves and outputs the correct metadata bit, applying that metadata bit to select the corresponding application data fragment for output from the decode engine (along with the corresponding syndrome). In the FIG. 7 embodiment, the codeword decode operation (including resolving the metadata bit and corresponding application data block/syndrome) is carried out in parallel within the q decode engines 257 for each of the inbound codewords, FDX encoder 253 outputs the q-bit metadata value (each bit sourced by a respective one of decode engines 257) together with a composite syndrome value and complete V-bit application data block, the latter formed (like the q-bit metadata value) by aggregating the q fragments output from respective RS decode engines. As discussed above, the total number of RS decodes executed to recover the q-bit metadata value is 2q (i.e., q RS decode engines each implementing two RS decode operations) instead of $2^q$, thereby reducing the requisite number of parallel RS decode circuits for metadata values constituted by three or more bits. And decode circuit footprint may be further reduced where codewords are read out in serial sets (i.e., each such set of codewords being followed by one or more other sets within the read-out data burst) as a given set of one or more decode engines may operate on those serial codeword sets one at a time (iterative decode). As an example, a single pair of decode engines 257 (four component RS decoders 261) may decode a four-codeword cache line that is read out two codewords at a time—i.e., output data burst includes an initial two codewords over a leading half of the burst interval, and a final two codewords over the trailing half of the burst interval, with the two decode engines operating iteratively on the two sets of codewords.

Figure 8:
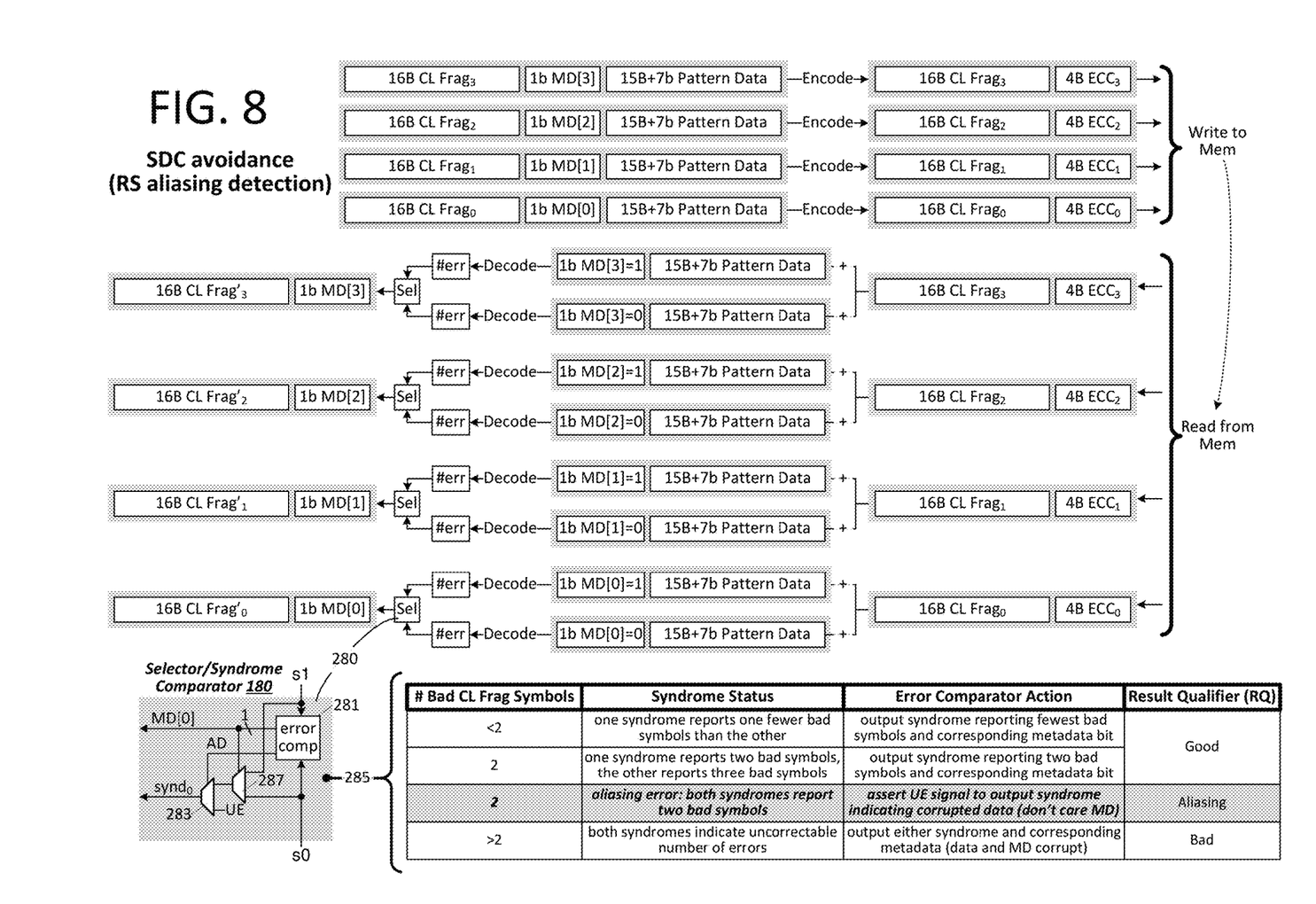
FIG. 8 presents a conceptual encoding/decoding operation implemented within the FIG. 7 hardware set with respect to a 64-byte (64 B) cache line and 4-bit (4b) metadata value.

FIG. 8 presents a conceptual encoding/decoding operation implemented within the FIG. 7 hardware set with respect to a 64-byte (64 B) cache line and 4-bit (4b) metadata value. As shown, the cache line is decomposed into four 16 B fragments, with each such fragment separately RS-encoded together with a respective bit (MD[0], MD[1], MD[2] or MD[3]) of the metadata value and a 15 B, 7-bit pattern data value (e.g., a padding value formed from all '0's or all '1's or any other fixed or dynamic pattern as discussed above). In one embodiment, RS-encoding is implemented with byte-sized symbols (m=8) and two-symbol error correction capability (i.e., n−k=4) so that each cache-line fragment encoding operation (with metadata bit and pattern data) yields a 20 B codeword consisting of the original 16 B cache line fragment and a 4 B (four-symbol) ECC value, the latter reflecting the metadata bit (to be clear, no padding data is included within the codeword). When read back from memory (i.e., after writing the RS-encoder-generated codewords to memory, and in response to host request to retrieve the subject cache line), the four codewords are subject to respective RS-decode operations—two RS-decodes for each codeword (to reflect the two possible values of the metadata bit RS-encoded with the cache line fragment) and thus eight RS decodes in all. As discussed above, each RS decode yields an error-count-specifying syndrome (depicted conceptually in FIG. 8 as "#err"), with the syndrome pair corresponding to a given codeword supplied to back-end circuitry ("Sel") that selects one of the two decoder outputs as the error-corrected cache line fragment (CL Frag'), recovered metadata bit and fragment syndrome.

In the FIG. 8 embodiment, each of the selector circuits (shown in a single exemplary instance in detail view 280 includes circuitry to detect and report an error-count aliasing condition that would otherwise constitute a silent data corruption—the statistical tendency of an RS decoder to erroneously report a codeword bearing three symbol errors as having only two (i.e., reporting 1+(n−k)/2 symbol errors (uncorrectable) as (n–k)/2 symbol errors (correctable)). More specifically, an error comparator circuit 281 determines whether incoming syndromes s0 and s1 (each from a respective RS decode with data differing only with respect to metadata bit value) each report two symbol errors—an error-count aliasing condition—and, if so, responsively asserts an alias-detect (AD) signal to output (i.e., select as the final syndrome output via multiplexer 283) a value that indicates an uncorrectable error (UE) and thus a corrupted RS decode result. As any such error-count aliasing would, in absence of the additional/redundant RS decode applied to recover the metadata bit, mask the data corruption (i.e., erroneously reporting a codeword having an uncorrectable/uncorrected number of errors as an error-corrected result), the additional decode applied to recover the metadata bit from each codeword brings additional benefit of detecting silent data corruption events—signaling and enabling avoidance of conventionally undetected data corruptions that, though statistically rare, may occur with respect to data at any operating-system privilege level and thus yield damaging consequences.

In the FIG. 8 example, error comparator 281 outputs a metadata bit and alias-detect (AD) signal state in accordance with the table at 285—outputting the syndrome (s0 or s1 via mux 287) that reports the fewest bad symbols so long as one syndrome reports two or fewer bad symbols and one fewer bad symbol than the other (first two table rows following header); asserting the alias-detect signal if both syndromes report two bad symbols (the error-count aliasing condition), and outputting either syndrome and corresponding metadata value if both syndromes report an uncorrectable number of errors (i.e., indicating that data is corrupt). The tabulated operation of error comparator 280 is provided for purposes of example only—various alternative error comparator actions may apply in alternative embodiments, particularly where RS encoding/decoding is implemented with greater or lesser symbol-error detection/correction capability.

Figure 9A:
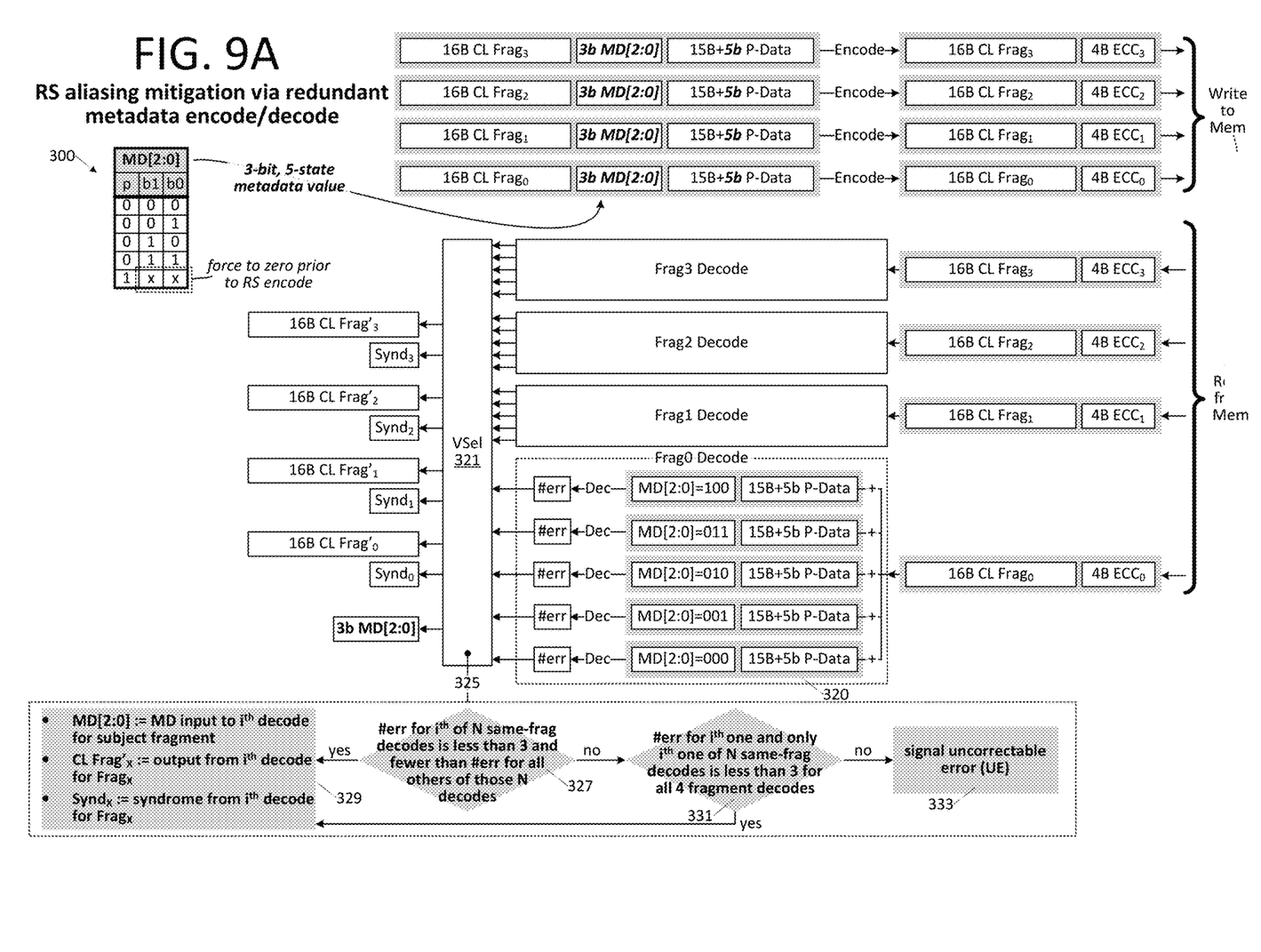
FIG. 9A illustrates an alternative RS metadata encoding/recovery approach in which a multi-bit metadata value is redundantly applied in cache-line-fragment RS encoding and decoding operations to exponentially lower the likelihood of error-count aliasing.

FIG. 9A illustrates an alternative RS metadata encoding/recovery approach in which a multi-bit metadata value is redundantly applied in cache-line-fragment RS encoding and decoding operations to exponentially lower the likelihood of error-count aliasing. More specifically, observing that (i) RS-decode aliasing occurs infrequently in absence of systemic error, and (ii) one of the two equal-error-count syndromes generated in that aliasing event corresponds to a valid, error-corrected cache line fragment (and metadata bit), the FIG. 9A embodiment redundantly encodes/decodes the same multi-bit metadata value with respect to each of the different cache line fragments (and pattern data) to enable metadata recovery with respect to any one of those fragment encode/decode operations despite aliasing in any or all others of the fragment encode operations.

In the FIG. 9A example, a 3-bit metadata value encodes five possible states as shown in table 300: four metadata states represented by the four possible combinations of two constituent bits of the metadata value (b1, b0), and a fifth metadata state represented by assertion of a third constituent bit (the "poison" bit) of the metadata value—the poison bit assertion (e.g., to logic '1') indicating, for example, that the cache line is invalid, rendering cache-line status/ownership information encoded in the other two bits meaningless (don't care) and subject to manipulation (e.g., forced to deterministic values '00' or '11') during RS encode so as to limit the total number of possible metadata values to five. Accordingly, cache line fragment encoding is implemented generally as discussed above, except with redundant application of the same 3-bit metadata value (instead of a distinct single metadata bit) in each RS encode and corresponding adjustment of the pattern data size (15 B, 5 b instead of 15 B, 7 b, with the 5 bits of pattern data rounding out the symbol containing the three metadata bits). Cache-line fragment decoding is likewise implemented as discussed above, except with five per-fragment decode operations (instead of two) to identify one of five possible metadata values (instead of two possible states of a single metadata bit)—an operation shown conceptually at 320 in the fragment-0 decode. Additionally, instead of resolving constituent metadata bits at the back end of respective metadata decoding operations, the five error syndromes generated in each fragment decode (i.e., as represented by "err #" in FIG. 9A) are supplied to vote/select circuit 321 that performs a cache-line wide compare of the syndromes generated by the per-fragment RS decode operations (i.e., 20 syndromes in this four-fragment, 5-decode per fragment example) to recover an output metadata value and to apply that recovered metadata value in selection of the corresponding decoded and error-corrected cache line fragment outputs (and also select the correct per-fragment syndromes). In the example shown, the vote/select circuit determines whether, for the N=5 RS decode operations executed with respect to a given codeword (i.e., cache line fragment+ECC value returned from memory read), the syndrome for one of those decodes shows (i) a correctable number of symbol errors (e.g., fewer than 3 symbol errors in an (n–k)/2=2 RS decoder), and (ii) fewer symbol errors than all others of those N decodes—an operation shown within an exemplary vote/select operational flow (325) at 327. Voter/selector responds to an affirmative determination at 327—i.e., indicating that the correct metadata value has been identified (i.e., one fewer symbol error, no error-count aliasing)—by outputting the metadata value corresponding to the RS-decode that yielded one fewer symbol errors than all others (the "$i^{th}$" of the N RS decode operations for the subject fragment) and by outputting the cache line fragment and syndrome corresponding to the $i^{th}$ RS decode operation from each of the four fragment decode operations (329). If none of the cache-line fragment decodes yields an affirmative determination at 327 (i.e., no instance in which one of N RS decode operations for a given cache fragment yields an error count below the correctability threshold and one fewer than the other N–1 RS decode operations for that fragment), vote/select logic 321 determines at 331 whether the error count indicated by the $i^{th}$ RS decode operation—and only for the $i^{th}$ RS decode operation—is within the error correction limit (less than three in this example) for all fragment decode operations as shown at decision block 331. If so (i.e., affirmative determination at 331), vote/select logic 321 implements the metadata, cache line fragment and syndrome outputs shown at 329. Otherwise, if neither of the evaluations at 327 and 329 (assessments implemented in parallel within combinatorial logic, for example) is affirmative, an uncorrectable error is signaled at 333.

Figure 9B:
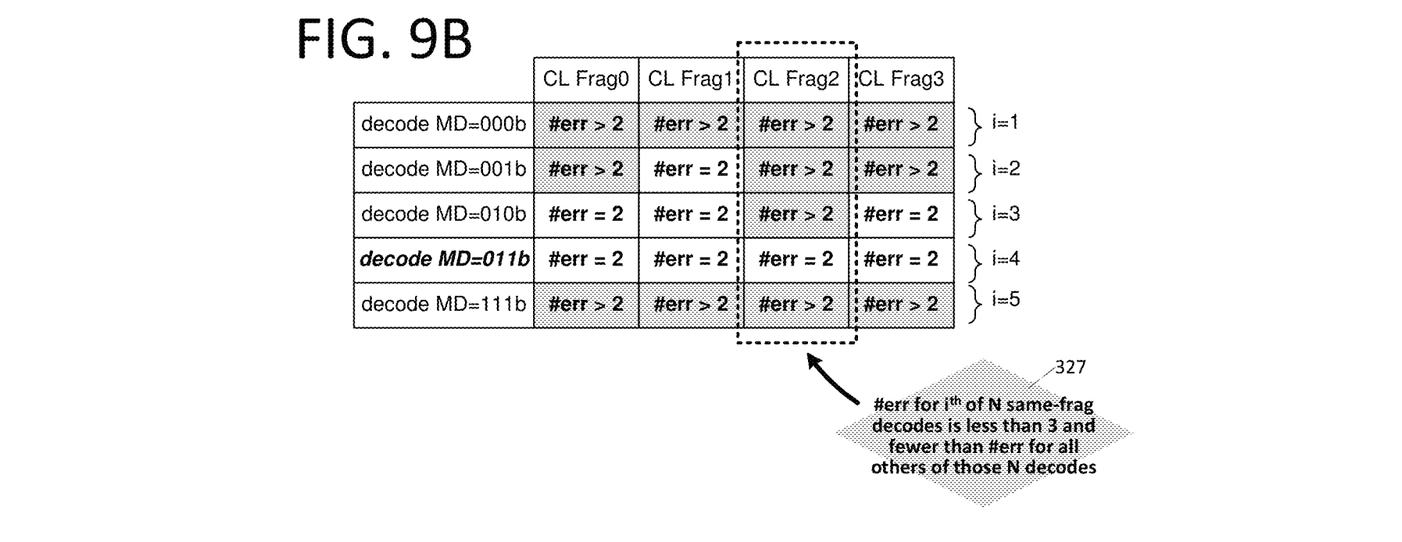
FIGS. 9B and 9C illustrate RS decode examples that yield affirmative determinations within respective decision blocks shown in the operational flow of FIG. 9A.
Figure 9C:
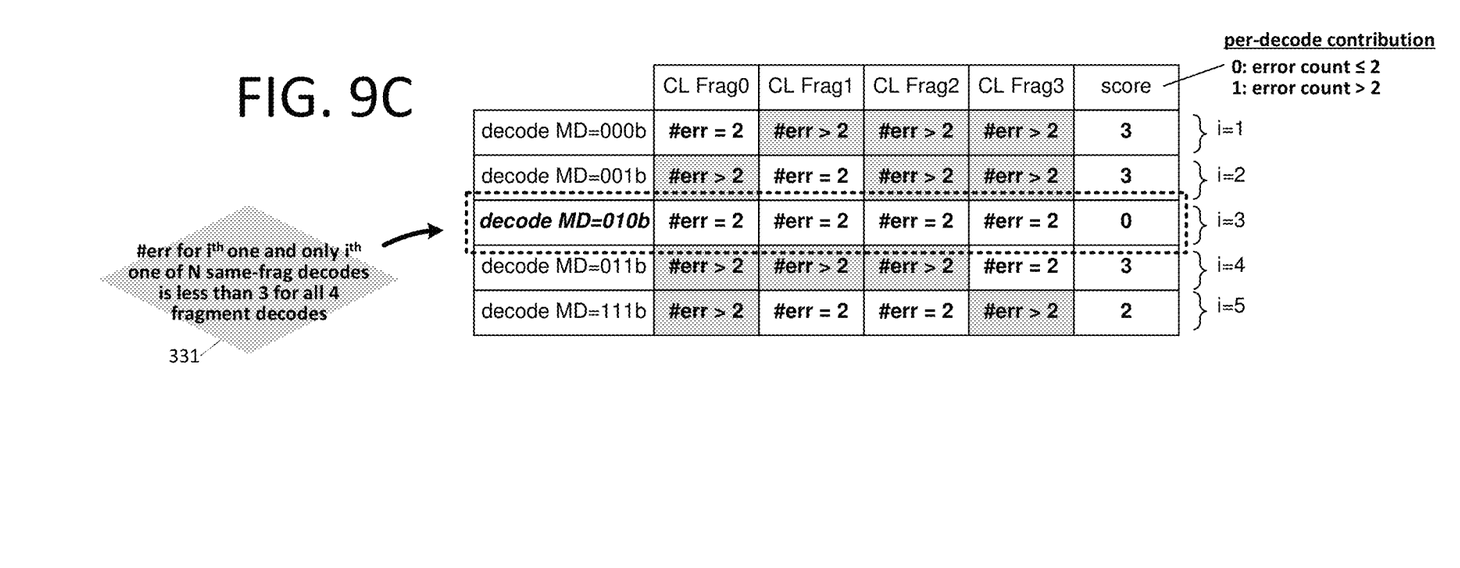

FIGS. 9B and 9C illustrate RS decode examples that yield affirmative determinations within the decision blocks at 327 and 331 of FIG. 9A, respectively. In the FIG. 9B example, despite aliasing within the decode operations for cache-line fragments 0, 1 and 3 (i.e., aliasing indicated by two or more instances of two-symbol-error detections with respect to different metadata values), the error count for the fourth ($i^{th}$) of five decode operations for cache line fragment 2 (i.e., for which MD=011b) is within the error-correction limit (less than 3 in this example) and less than the error counts for each of the other four decodes with respect to that fragment—yielding an affirmative determination in decision block 327 to produce '011b' as the recovered metadata value (and selection of corresponding cache-line fragment and syndrome output). In the FIG. 9C example, an aliasing event occurs within each set of five decode operations for each of the four cache lines (i.e., yielding a negative determination at decision block 327 of FIG. 9A). However, because the error count for same one—and only that one—of the five per-fragment decodes is within the error correction limit for all four fragments (i.e., the decodes for i=3, corresponding to metadata value 010b), an affirmative determination occurs in decision block 329 to produce '010b' as the recovered metadata value (and selection of corresponding cache-line fragment and syndrome output). Conceptually, at least, the cross-fragment assessment shown at 331 in FIGS. 9A and 9C may be implemented by scoring or voting logic—for example, combinatorial circuitry that tallies the number of uncorrectable error determinations across all four fragments for each different metadata value (i.e., five "scores" each corresponding to a respective metadata value), comparing the results to confirm that one and only one such tally (score) shows zero uncorrectable errors. In the FIG. 9C example, for instance, only the score for metadata value 010 b indicates zero uncorrectable-error detections (the four decodes for each of the other metadata values yielding a score of two or higher), thus enabling the vote/select logic to recover a valid metadata value (010b) despite aliasing within the decode operations for all four cache line fragments.

Referring again to FIG. 9A, the redundant metadata recovery implemented within the depicted RS decoder exponentially reduces the already low probability of error-count aliasing (to the fourth power in this four-fragment example and to a higher power if the cache line is encoded into more than four codewords)—rendering the aliasing likelihood to the point of negligibility. Moreover, while the number of RS decode operations increases relative to the decode-per-metadata bit approach in FIG. 7 (e.g., 20 RS decodes in the 5-state metadata example of FIG. 9A), RS decode operations may be executed iteratively to reduce the requisite number of RS decode circuits, particularly where codewords are serialized within a data burst and thus may be decoded one after another (or, more generally, subset after subset). If at the end of the voting/scoring process, an affirmative decision about metadata cannot be made, the voting/scoring logic declares an uncorrectable error.

Figure 10:
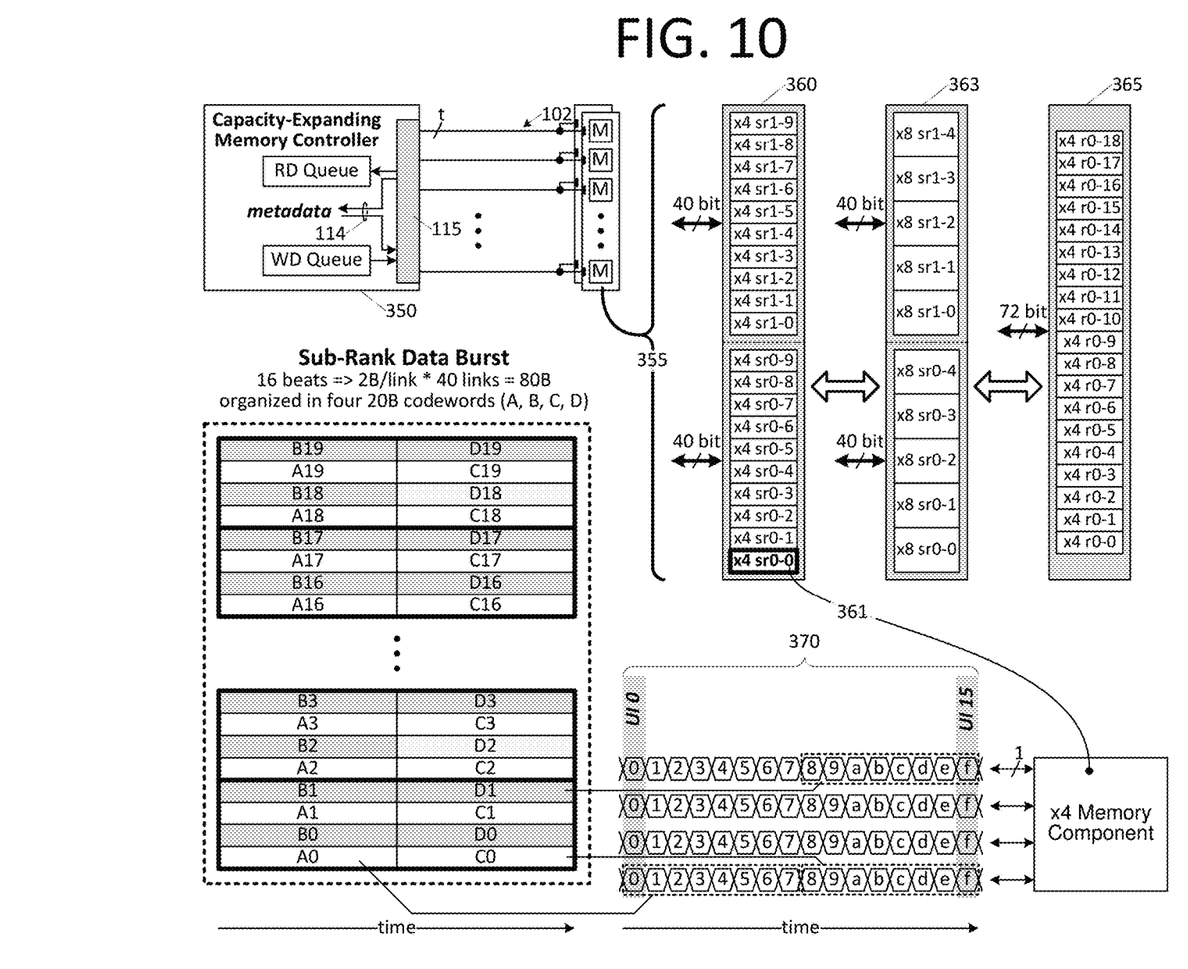
FIG. 10 illustrates an embodiment of an aliasing-mitigating, capacity-expanding memory control component and its interconnection to DIMMs of various form-factors and configurations.

FIG. 10 illustrates an embodiment of an aliasing-mitigating, capacity-expanding memory controller 350 (e.g., as implemented at the memory interface of a host IC and/or within a buffer chip, etc.) and its interconnection to various DIMMs 355 implemented according to representative standards. The DIMM shown at 360, for instance, is coupled to controller 350 via two 40-bit "sub-rank" memory channels (ten 4-bit memory ICs 361 coupled to respective 4-bit slices of a given sub-rank memory channel and designated sr #-0 through sr #-9, where '#' denotes the sub-rank number 0 or 1), while DIMM 363 implements the same pair of sub-ranks with a halved number of doubled-width memory ICs (5×8 memory ICs per sub-rank). The DIMM at 365 implements a single 72-bit memory channel with 18 devices per memory rank. Memory controller may be coupled to DIMMs according to various other configurations (number of constituent memory devices per rank/sub-rank, number of memory channels, etc.) in alternative embodiments, and the depicted DIMMs (and any others) may include various unshown components (e.g., data buffers disposed between DIMM data interfaces and externally signaling links, registered clock driver components coupled to command/address and other control lines, serial presence detect, non-volatile backing memory, etc.). In particular, each of the depicted DIMMs includes a counterpart memory rank or pair of sub-ranks on the opposite face of the DIMM substrate (i.e., so that each of DIMMs 360 and 363 includes a total of four 40-bit sub-ranks, with two sub-ranks coupled to each memory channel; and DIMM 365 includes two 72-bit memory ranks).

Still referring to FIG. 10, data transfers over a given memory channel may be organized spatially and temporally to convey serial pairs of codewords containing respective cache line fragments and associated ECC values. In the DIMM configurations having two 40-bit memory channels, for example, physical signaling interfaces (PHYs) within the controller and memory device execute counterpart serialization and deserialization operations with respect to outbound and inbound codewords to convey constituent symbols of those codewords serially over each controller-to-DIMM data link. In one embodiment, for example, the four 20 B codewords shown in FIG. 8—each containing respectively a 16 B cache line fragment and 4 B ECC value—are conveyed in a single sub-rank data burst over the 40-bit memory channel, conveying 40-bits per unit interval (UI) over 16 back-to-back UIs as shown at 370 with respect to the four data links coupled to a given memory IC within the sub-rank. Accordingly, two full codewords—A and B, with codeword A constituted by bytes A0-A19, and codeword B constituted by bytes B0-B19—may be transmitted over a first temporal half (first 8 UIs) of the sub-rank data burst, and the remaining two codewords (C and D constituted by C0-C19 and D0-D19, respectively) conveyed over the second half of the sub-rank burst interval so that the two codeword pairs (A/B and C/D) may be decoded sequentially within the RS decoder set (i.e., executing decode operations iteratively with respect to the A/B and C/D codeword pairs), halving the requisite number of RS decoders relative to the architecture shown in FIG. 9A. In other embodiments, the four codewords may be conveyed in four sequential intervals, with the entirety of codeword A being transmitted over an initial four UIs (4 bits*40 links=20 B), followed by entirety of codeword B over the subsequent four UIs and then codeword C and then codeword D. In that case (and assuming, for example, the 5 RS decode operations per codeword shown in FIG. 9A), five RS decoders may iteratively decode (in four iterations) the four incoming codewords. In either of those serial-codeword implementations, the RS decoder outputs for initially decoded codewords may be buffered to ensure their availability for fragment/syndrome selection with respect to a metadata value ascertained from a later decoded codeword.

Figure 11:
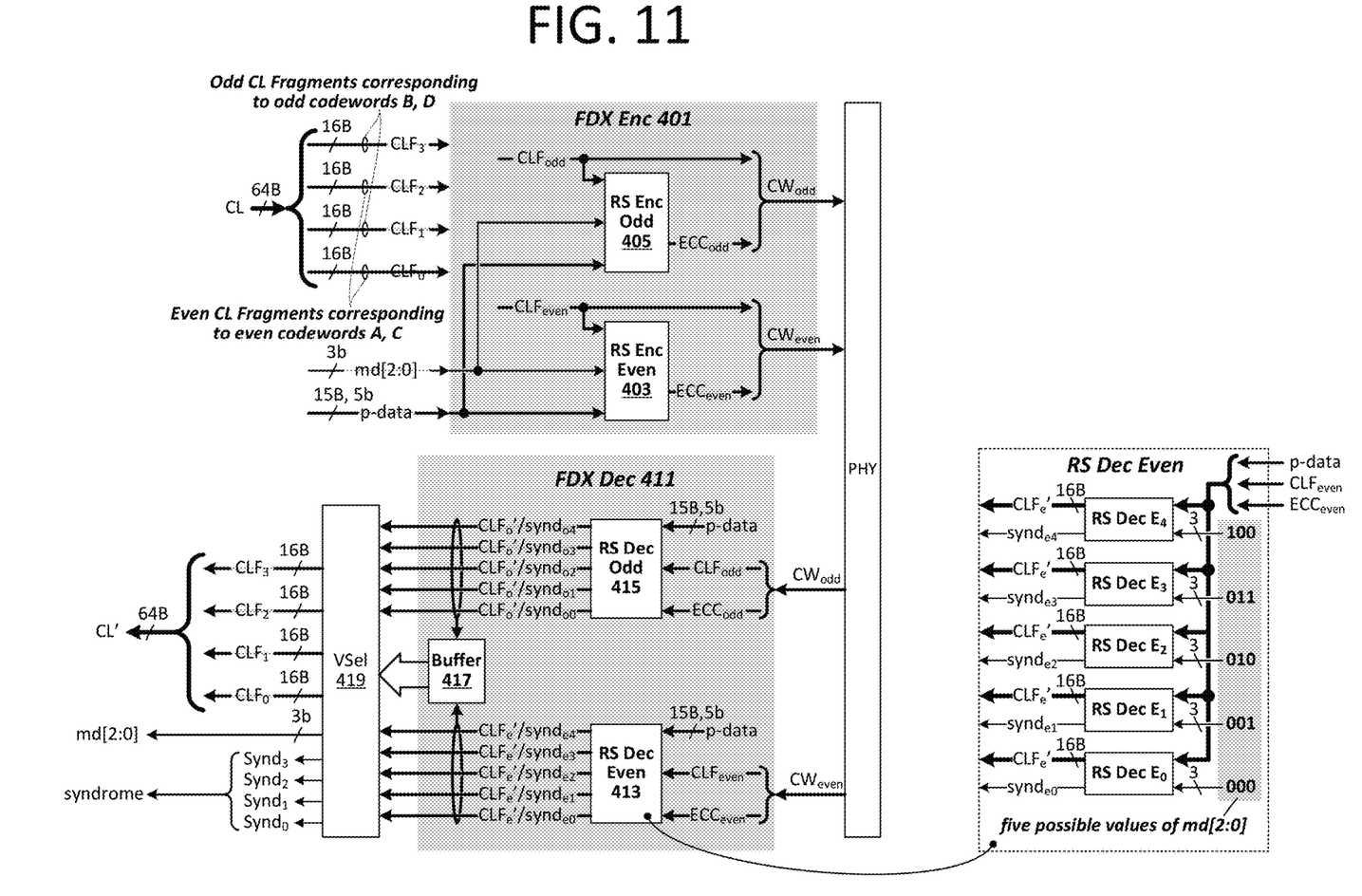
FIG. 11 illustrates an example of a data-expanding RS-encoding/decoding architecture that iteratively encodes cache line fragments and metadata into codeword pairs in a memory write transaction and then, during cache line read back, iteratively decodes those cache line fragments to recover the original metadata and generate error-corrected cache line fragments.

FIG. 11 illustrates an example of a data-expanding RS-encoding/decoding architecture that iteratively encodes cache line fragments and metadata into codeword pairs (e.g., A/B and C/D as in FIG. 10) in a memory write transaction and then, during cache line read back (memory read transaction), iteratively decodes those cache line fragments to recover the original metadata and generate error-corrected cache line fragments. In the depicted embodiment, a 64 B cache line is supplied to FDX encoder 401 in parallel 16 B fragments ($CLF_0$-$CLF_3$), with component even and odd RS encoders (403, 405) executing two sequential RS encoding operations to generate two sets of even/odd codewords and corresponding even/odd ECC values. For example, even-fragment RS encoder 403 encodes even-numbered cache line fragment $CLF_0$ (together with a three-bit metadata value and pattern data) to yield a leading even-fragment codeword $CW_{even}$ (consisting of $CLF_0$ and a corresponding ECC value, $ECC_{even}$) and then, in an ensuing encode interval, encodes even-numbered cache line fragment $CLF_2$ (with pattern data and the same 3-bit metadata value) to yield a trailing even-fragment codeword. Odd RS encoder 405 executes counterpart iterative encoding operations to generate (simultaneously with iterative generation of even-fragment codewords within RS encoder 403), leading and trailing odd-fragment codewords ($CW_{ODD}$ corresponding to $CLF_1$ and then to $CLF_3$, respectively).

FDX decode engine 411 executes operations inverse to those implemented within FDX encoder 401, iteratively decoding the even-fragment codewords (supplemented by corresponding ECC values, pattern data and candidate metadata values) within even-fragment decoder 413 and, at the same time, iteratively decoding the odd-fragment codewords within odd-fragment decoder 415. As shown with respect to detail view of even-fragment RS decoder 413, five component decoders execute RS decode operations with respect to the five possible states (in this example) of the 3-bit metadata value so that each of the even-fragment and odd-fragment RS decoders generates a respective set of five outputs each consisting of a putatively error-corrected cache line fragment and corresponding syndrome. In the unlikely event that none of the ten syndromes (five from each of decoders 413 and 415) generated in the initial decode iteration resolve the metadata value (i.e., no syndrome indicates fewer than three symbol errors and one fewer symbol error than all others with respect to a given codeword), the error-corrected cache line fragments (and optionally the syndromes also) may be stored within buffer 417 to enable later selection of individual cache-line fragment instances (i.e., one of the five cache line fragments output by decoder 413 and one of the five cache line fragments output by decoder 415) pursuant to successful resolution of the metadata value in the trailing even-fragment and odd-fragment decode operations. The latter of the two RS decode operations is executed in the same manner as the first, but with vote/select circuitry 419 generating a finalized output (i.e., now that the results of all 20 decode operations are known). Though four parallel cache line fragment outputs are shown, the even and odd cache line fragment pairs (i.e., initial pair corresponding to the initial RS decode iteration, and the latter pair corresponding to the latter RS decode iteration) may be output sequentially over a shared set of output lines. The vote/selector may output a finalized syndrome in view of the totality (20) of syndromes generated or may output a respective syndrome per cache line fragment (i.e., either in parallel as shown, or sequentially) or any combination thereof.

Referring to FIGS. 1-11 generally, any and all of the capacity-expanding memory controllers presented herein may be implemented within a standalone integrated circuit component or packages or within one or more IC components (including packages having multiple IC dies) that combines the memory control function with one or more other functions (e.g., integrated-circuit processor, application-specific integrated circuit (ASIC), etc.). Also, one or more programmed microcontrollers and/or dedicated hardware circuits (e.g., finite state machines, registered or combinational circuits, etc.) may implement and/or control all or part of the various architectural and functional elements within the memory controller architectures presented herein (e.g., to implement any one or more of the ECC decoders, encoders, pattern data generators, syndrome comparator, etc.). Additionally, any or all of those architectural/functional elements (including the entirety of an over-capacity memory controller architecture according to embodiments herein) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various memory device widths, per-DIMM device counts, singling path widths, data block sizes, data block fragment sizes, cache line sizes, meta data bit depths, number of valid meta data states, number of encode/decode iterations, message lengths, encoding/decoding schemes and parameters, host interface types, data-unit or symbol sizes (e.g., nibbles, bytes), metadata sizes, error detection/correction capabilities, counter bit-depths, counter architectures, and so forth are provided for purposes of example only—any practicable alternatives may be implemented in all cases. Similarly, signaling link parameters, protocols, configurations may be implemented in accordance with any practicable open or proprietary standard and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit component comprising:
   control circuitry to retrieve, from an external data storage, first and second data blocks and corresponding first and second error correction codes;
   decoding circuitry to:
      execute a first plurality of error detection/correction operations with respect to a first plurality of data volumes to generate a corresponding first plurality of error syndrome values, each data volume of the first plurality of data volumes being constituted, at least in part, by the first data block and the first error correction code together with a respective one of a plurality of unique q-bit metadata values, q being an integer greater than or equal to one; and
      execute a second plurality of error detection/correction operations with respect to a second plurality of data volumes to generate a corresponding second plurality of error syndrome values, each data volume of the second plurality of data volumes being constituted, at least in part, by the second data block and the second error correction code together with a respective one of the plurality of unique q-bit metadata values; and
   output circuitry to select one of the plurality of q-bit metadata values to be an output q-bit metadata value according to error-count differentiation indicated by the first and second pluralities of error syndrome values.

2. The integrated circuit component of claim 1 further comprising circuitry to generate the first error correction code based, at least in part, on the first data block and an input q-bit metadata value and to generate the second error correction code based, at least in part, on the second data block and the input q-bit metadata value.

3. The integrated-circuit component of claim 2 further comprising an interface to receive the input q-bit metadata value and the first and second data blocks from an external device.

4. The integrated-circuit component of claim 2 wherein the output q-bit metadata value represents a recovered instance of the input q-bit metadata value.

5. The integrated-circuit component of claim 2 wherein the control circuitry comprises circuitry to store the first and second error correction codes and the first and second data blocks within the external data storage in a memory write transaction prior to retrieving the first and second data blocks and the first and second error correction codes from the external data storage.

6. The integrated-circuit component of claim 2 wherein the circuitry to generate the first error correction code and the second error correction code comprises Reed-Solomon encoding circuitry.

7. The integrated circuit component of claim 1 wherein the decoding circuitry to execute the first plurality of error detection/correction operations and the second plurality of error detection/correction operations comprises Reed-Solomon decoding circuitry.

8. The integrated circuit component of claim 1 wherein the output circuitry to select one of the plurality of q-bit metadata values to be the output q-bit metadata value according to error-count differentiation indicated by the first and second pluralities of error syndrome values comprises circuitry to determine whether the first plurality of error syndrome values includes an error syndrome value that reports (i) fewer symbol errors than all others of the error syndrome values within the first plurality, and (ii) correction of any symbol errors within the first data block.

9. The integrated circuit component of claim 8 wherein the output circuitry to select one of the plurality of q-bit metadata values to be the output q-bit metadata value according to error-count differentiation indicated by the first and second pluralities of error syndrome values further comprises circuitry to determine whether the second plurality of error syndrome values includes an error syndrome value that reports (i) fewer symbol errors than all others of the error syndrome values within the second plurality, and (ii) correction of any symbol errors within the second data block.

10. The integrated circuit component of claim 9 wherein the output circuitry to select one of the plurality of q-bit metadata values to be the output q-bit metadata value comprises circuitry to select, as the output q-bit metadata value, the q-bit metadata value included within one of the first and second pluralities of data volumes.

11. A method of operation with an integrated-circuit (IC) component, the method comprising:
   retrieving first and second data blocks and corresponding first and second error correction codes from an external data storage;
   executing a first plurality of error detection/correction operations with respect to a first plurality of data volumes to generate a corresponding first plurality of error syndrome values, each data volume of the first plurality of data volumes being constituted, at least in part, by the first data block and the first error correction code together with a respective one of a plurality of unique q-bit metadata values, q being an integer greater than or equal to one; and
   executing a second plurality of error detection/correction operations with respect to a second plurality of data volumes to generate a corresponding second plurality of error syndrome values, each data volume of the second plurality of data volumes being constituted, at least in part, by the second data block and the second error correction code together with a respective one of the plurality of unique q-bit metadata values; and
   selecting one of the plurality of q-bit metadata values to be an output metadata value according to error-count differentiation indicated by the first and second pluralities of error syndrome values.

12. The method of claim 11 further comprising:
generating the first error correction code based, at least in part, on the first data block and an input q-bit metadata value; and
generating the second error correction code based, at least in part, on the second data block and the input q-bit metadata value.

13. The method of claim 12 further comprising receiving the input q-bit metadata value and the first and second data blocks from an external device.

14. The method of claim 12 wherein the output q-bit metadata value represents a recovered instance of the input q-bit metadata value.

15. The method of claim 12 further comprising storing the first and second error correction codes and the first and second data blocks within the external data storage in a memory write transaction prior to retrieving the first and second data blocks and the first and second error correction codes from the external data storage.

16. The method of claim 12 wherein generating the first error correction code and the second error correction code comprises generating the first and second error correction codes in respective Reed-Solomon encoding operations.

17. The method of claim 11 wherein executing the first plurality of error detection/correction operations and the second plurality of error detection/correction operations comprises executing a first plurality of Reed-Solomon decoding operations and a second plurality of Reed-Solomon decoding operations, respectively.

18. The method of claim 11 wherein selecting one of the plurality of q-bit metadata values to be the output q-bit metadata value according to error-count differentiation indicated by the first and second pluralities of error syndrome values comprises determining whether the first plurality of error syndrome values includes an error syndrome value that reports (i) fewer symbol errors than all others of the error syndrome values within the first plurality, and (ii) correction of any symbol errors within the first data block.

19. The method of claim 18 wherein selecting one of the plurality of q-bit metadata values to be the output q-bit metadata value according to error-count differentiation indicated by the first and second pluralities of error syndrome values further comprises determining whether the second plurality of error syndrome values includes an error syndrome value that reports (i) fewer symbol errors than all others of the error syndrome values within the second plurality, and (ii) correction of any symbol errors within the second data block.

20. The method of claim 19 wherein selecting one of the plurality of q-bit metadata values to be the output q-bit metadata value comprises selecting, as the output q-bit metadata value, the q-bit metadata value included within one of the first and second pluralities of data volumes.

21. An integrated circuit component comprising:
means for retrieving first and second data blocks and corresponding first and second error correction codes from an external data storage;
means for:
executing a first plurality of error detection/correction operations with respect to a first plurality of data volumes to generate a corresponding first plurality of error syndrome values, each data volume of the first plurality of data volumes being constituted, at least in part, by the first data block and the first error correction code together with a respective one of a plurality of unique q-bit metadata values, q being an integer greater than or equal to one; and
executing a second plurality of error detection/correction operations with respect to a second plurality of data volumes to generate a corresponding second plurality of error syndrome values, each data volume of the second plurality of data volumes being constituted, at least in part, by the second data block and the second error correction code together with a respective one of the plurality of unique q-bit metadata values; and
means for selecting one of the plurality of q-bit metadata values to be an output q-bit metadata value according to error-count differentiation indicated by the first and second pluralities of error syndrome values.

\* \* \* \* \*